(12) United States Patent
Tannenbaum

(10) Patent No.: US 7,733,349 B1
(45) Date of Patent: Jun. 8, 2010

(54) DEVICE, METHOD, AND SYSTEM FOR GENERATING PER-PIXEL LIGHT VALUES USING TEXTURE PARAMETERS

(75) Inventor: David C. Tannenbaum, San Jose, CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/265,493

(22) Filed: Mar. 9, 1999

(51) Int. Cl.
*G06T 11/40* (2006.01)
(52) U.S. Cl. ..................................... 345/582
(58) Field of Classification Search .............. 345/430, 345/429, 431, 432, 581, 582
See application file for complete search history.

(56) References Cited

U.S. PATENT DOCUMENTS

| | | | |
|---|---|---|---|
| 5,097,427 A * | 3/1992 | Lathrop et al. | 395/130 |
| 5,182,797 A | 1/1993 | Liang et al. | 395/160 |
| 5,412,765 A * | 5/1995 | Yamrom et al. | 345/587 |
| 5,526,471 A | 6/1996 | Tannenbaum et al. | 395/119 |
| 5,659,671 A * | 8/1997 | Tannenbaum et al. | 395/126 |
| 5,710,876 A * | 1/1998 | Peercy et al. | 345/426 |
| 5,805,782 A * | 9/1998 | Foran | 395/126 |
| 5,812,141 A * | 9/1998 | Kamen et al. | 345/430 |
| 5,880,736 A * | 3/1999 | Peercy et al. | 345/426 |
| 5,977,982 A * | 11/1999 | Lauzon | 345/582 |
| 6,057,850 A * | 5/2000 | Kichury | 345/430 |
| 6,078,332 A * | 6/2000 | Ohazama | 345/426 |
| 6,226,005 B1 * | 5/2001 | Laferriere | 345/426 |
| 6,226,012 B1 * | 5/2001 | Priem et al. | 345/606 |
| 6,515,674 B1 * | 2/2003 | Gelb et al. | 345/582 |

OTHER PUBLICATIONS

PCT International Search Report in International Application No. PCT/US 00/06184, dated Jul. 10, 2000, 5 pages.
Gabriele Englert, "A Model for Description and Synthesis of Heterogeneous Textures." *Eurographics '89*, Proceedings of the European Computer Graphics Conference and Exhibition, Sep. 8, 1989, 13 pages.
Foley et al., "*Computer Graphics Principles and Practice*", $2^{nd}$ Ed. in C, 1997, p. 721-814.
Woo et al., "*OpenGL Programming Guide*", $2^{nd}$ Ed., Version 1.1, 1997, p. 169-211.

* cited by examiner

*Primary Examiner*—Jeffery A Brier
(74) *Attorney, Agent, or Firm*—Woodcock Washburn LLP

(57) ABSTRACT

A method for applying texture mapping in per-pixel operations includes receiving a plurality of parameters. The parameters define a pixel value at a pixel in a graphics primitive. From among these parameters, a set of parameters is selected to be associated with textures. The parameters that are not selected define a set of unselected parameters that have constant values over the primitive. A texture value is then determined for each of the selected parameters by accessing a set of textures, with the texture value for the selected parameters varying over the primitive. The pixel value at the pixel is then evaluated using the constant unselected parameters and the texture values for the selected parameters. A device and system for applying texture mapping in per-pixel operations also are described.

20 Claims, 6 Drawing Sheets

DEVICE, METHOD, AND SYSTEM FOR GENERATING PER-PIXEL LIGHT VALUES USING TEXTURE PARAMETERS

CROSS REFERENCE TO RELATED APPLICATIONS

This application is related to U.S. patent application Ser. No. 09/265,507 filed Mar. 9, 1999 and entitled "Method and Device for Generating Per-Pixel Light Values," by inventor David C. Tannenbaum et al., the disclosure of which is incorporated herein by reference. This application is also related to U.S. patent application Ser. No. 09/265,487 filed Mar. 9, 1999 and entitled "Method and Device for Associating a Pixel with One of a Plurality of Regions in a Logarithm or Cosine Space," by inventor David C. Tannenbaum, the disclosure of which is incorporated herein by reference. Both of these related applications are assigned to the assignee of the present application.

BACKGROUND OF THE INVENTION

The present invention relates to the field of computer graphics and, more particularly, to the application of texture mapping to generate pixel values.

Rendering of realistic images (e.g., two- or three-dimensional images) is one of the main goals of graphics system designers. Rendering images of real or imaginary objects typically involves generating geometric models (e.g., polygons) of objects and applying lighting effects to polygonal surfaces. In computer graphics, surfaces of an object are generally modeled by a polygonal mesh, which is a collection of vertices, edges, and/or polygons. A mesh of polygons may be produced from a variety of sources such as an application, tesselated NURBS surfaces, spheres, cones, etc. The vertices may be connected by edges and a sequence of edges or vertices may define one or more polygons.

Rendering of realistic 3D graphics requires accurate and efficient modeling of 3D surfaces based upon the position, orientation, and characteristics of the surfaces and the light sources illuminating them. In particular, the interaction between lights and surfaces must be modeled for rendering. To accurately model lighting effects, conventional computer graphics systems have typically implemented a variety of lighting models and shading techniques to generate light values at individual pixels of a graphics primitive such as a polygon. A co-pending U.S. patent application Ser. No. 09/265,507, entitled "Method and Device for Generating Per-Pixel Light Values," by inventor David C. Tannenbaum et al., describes several exemplary lighting models and shading techniques.

Conventional lighting models typically model one or more lighting effects such as ambient light, diffuse reflection, specular reflection, and spotlighting, each of which is well known in the art. The ambient light accounts for a lighting effect resulting from multiple reflections of light from the surfaces present in a scene. On the other hand, the diffuse reflection models reflection of light off a dull, matte surface. In this model, the reflected light from the surface falls off uniformly as a function of an angle between N and L, where N is a normal vector at a surface point and L is a light vector. The diffuse light fall off in the diffuse reflection model is typically modeled by using a dot product term N·L.

Similarly, the specular reflection accounts for reflection of light off a shiny surface. When light from a light source is reflected off a surface, the reflected light falls off approximately exponentially from the direction of reflection vector R as seen from the direction of view vector V. For example, the fall off may be modeled by $\cos^8 \alpha$, where s is a surface material's specular reflection coefficient and $\alpha$ is an angle between the vectors R and V. In practice, a dot product power term $(N \cdot H)^s$ is often used in place of $\cos^8 \alpha$ to model specular reflection at a surface point, where N is a normal vector and H is a half-angle vector. Both the diffuse and specular reflection models assume that a light source (e.g., L vector) radiates light uniformly in all directions.

In contrast, the spotlight model adds a direction to a positional light source to allow modeling of directional lights. That is, a spotlight is a special type of light source that has a direction as well as a position. For example, a positional light source may function as a spotlight by restricting the shape of the light to a cone. The direction of the spotlight is the direction in which the light points. The spotlight thereby simulates a cone of light, which may have a fall-off in intensity based upon the distance from the center of the cone of light.

The ambient, diffuse, specular, and spotlight models are well known and are described in greater detail in *Computer Graphics: Principles and Practice* by James D. Foley et al., Addison-Wesley (1996), ISBN 0-201-84840-6, which is incorporated herein by reference and constitutes a portion of the background against which the present invention was developed. Additionally, the OpenGL™ (versions 1.1 and 1.2) application programming interface (API) describes various lighting models such as spotlighting, diffuse light reflection, specular light reflection, and related parameters for implementing such models. The OpenGL™ (versions 1.1 and 1.2) graphics application programming interface is commercially available from Silicon Graphics, Inc., the assignee of the present application, and is incorporated herein by reference.

By way of example, the OpenGL™ graphics application programming interface, version 1.1 evaluates a light value C at a pixel by implementing an exemplary lighting equation as follows:

$$C = e_{cm} + a_{cm} * a_{cs} + att * \text{spot}[a_{cm} * a_{cl} + (N \cdot L) d_{cm} * d_{cl} + (N \cdot H)^s s_{cm} * s_{cl}] \qquad \text{Eq. (1)}$$

The parameters in Equation (1) are defined as follows:
$e_{cm}$=emission material color,
$a_{cm}$=ambient material color,
$a_{cs}$=global ambient light color,
att=attenuation factor,
spot=spotlight effect,
$a_{cl}$=ambient light color,
$d_{cm}$=diffuse material color,
$d_{cl}$=diffuse light color,
$s_{cm}$=specular material color,
$s_{cl}$=specular light color,
s=specular exponent,
N=outward surface normal vector at the pixel,
L=light-source vector (pointing from pixel to light) at the pixel, and
H=half-angle vector between light-source vector and eye vector at the pixel.

In Equation (1), the attenuation factor att can be further defined as $1/[k_c + k_l d + k_q d^2]$, where d is the distance between a light's position and a pixel, $k_c$ represents constant attenuation, $k_l$ is linear attenuation, and $k_q$ represents quadratic attenuation. Those skilled in the art will appreciate that Equation (1) may be evaluated for each light source illuminating a pixel of interest.

In implementing a light equation to evaluate light color values, conventional techniques have typically assigned constant values for many of the parameters in the equations. For instance, conventional techniques typically assign a constant value to material parameters such as the ambient, diffuse, specular, and emission material colors. That is, all pixels within a graphics primitive (e.g., polygon) are assigned the same constant value for a given material parameter. The assignment of constant parameter values is relatively easy and inexpensive to implement in a computer system.

Unfortunately, while the constant modeling technique is simple and inexpensive to implement, it does not produce highly realistic surfaces. The reason for this is that the constant assignment scheme is based on the assumption that the entire surface of the primitive is constant. In reality, however, many surfaces of objects are not constant. Instead, the surface of a graphics primitive often has characteristics that vary over the surface of the primitive.

By way of example, a marble tabletop may not be equally shiny everywhere on its surface. As another example, consider a light shining through dense vegetation such as trees in a forest. In such a case, the conventional constant parameter assignment scheme may not be able to render a substantially realistic image of the light shining through the trees.

To model a surface that varies over the associated primitive, one prior art method has used a non-constant surface description to model the varying diffuse material properties of the surfaces such as the trees and marble tabletop. In this method, a unique color is assigned to each vertex of the polygon and then interpolated to obtain a per-pixel color. However, while the modeling of varying diffuse lights somewhat improves rendering of a varying surface, it does not adequately model other parameters that may vary over the surface. For example, parameters such as the ambient, specular, and emission material color may also vary over the surface. In addition, the parameters in the dot product terms of lighting Equation (1) such as the normal vector N, the specular exponent s, and the like generally vary over a surface in practice.

Thus, what is needed is a method, device, and system that can generate per-pixel color values by modeling parameters that vary over a surface of a graphics primitive.

SUMMARY OF THE INVENTION

Broadly speaking, the present invention fills these needs by providing a method, a device, and a system for efficiently generating pixel values using texture parameters. It should be appreciated that the present invention can be implemented in numerous ways, including as a process, an apparatus, a system, a device, a method, or a computer readable medium.

In one aspect of the invention, a method for generating per-pixel values by applying texture mapping in per-pixel operations is provided. In this method, a plurality of parameters is received. The received parameters define a pixel value at a pixel in a graphics primitive. Among these parameters, a set of parameters is selected to be associated with texture values. The parameters that are not selected define a set of unselected parameters that have constant values over the primitive. Next, a texture value is determined for each of the selected parameters by accessing a set of textures, where the texture value for the selected parameters may vary over the primitive. The pixel value at the pixel is then evaluated using the constant unselected parameters and the texture values for the selected parameters. In a preferred embodiment, the plurality of parameters defines a lighting model such that the generated pixel value is a light value at the pixel.

In another aspect of the invention, a device for generating per-pixel values of pixels in a primitive by using texture parameters is provided. The pixel values in the primitive are defined by a plurality of parameters. The device includes a texture memory for storing a set of texture maps. A texture unit receives texture coordinates for accessing a set of texture maps in the texture memory. The set of texture maps is associated with a set of selected parameters selected from among the plurality of parameters that define a pixel value in the primitive. The texture unit generates a texture value associated with the pixel from each of the selected texture maps. The parameters that are not selected from the plurality of parameters define a set of unselected parameters. A rendering unit generates the pixel value in response to the texture values of the selected parameters and to the unselected parameters.

In yet another aspect of the invention, a system for generating per-pixel values for pixels in a primitive is provided. The system includes a processor coupled to a bus, a main memory coupled to the bus, a storage unit coupled to the bus, and a graphics subsystem coupled to receive a plurality of parameters that define the pixel values for the pixels in a primitive. The graphics subsystem includes a means for selecting a set of parameters from the plurality of parameters. The selected parameters are associated with texture values and the parameters that are not selected define a set of unselected parameters that have constant values over the primitive. The graphics subsystem also includes a means for determining a texture value for each of the selected parameters by accessing a set of textures. The texture value for the selected parameters varies over the primitive. The graphics subsystem further includes a means for evaluating the pixel value by using the unselected parameters and the texture values.

The present invention advantageously provides a method, device, and system that can efficiently generate per-pixel light values in a primitive by using textures for one or more parameters. In particular, the present invention enables the generation of pixel values that vary over the surface of a primitive by using a set of texture maps. Each of the texture maps models varying characteristics of a parameter over a surface. By using the texture values instead of constant parameters in rendering a pixel, the present invention enables the rendering of a more realistic surface. In addition, by providing textures that can be selectively associated with one or more parameters, the present invention provides substantial flexibility in rendering an image of a surface. Other aspects and advantages of the invention will become apparent from the following detailed description, taken in conjunction with the accompanying drawings, illustrating by way of example the principles of the invention.

BRIEF DESCRIPTION OF THE DRAWINGS

The accompanying drawings, which are incorporated in and form a part of this specification, illustrate embodiments of the invention and, together with the description, serve to explain the principles of the invention.

DESCRIPTION OF THE PREFERRED EMBODIMENTS

Reference will now be made to the present preferred embodiments of the invention, examples of which are illustrated in the accompanying drawings.

In the following detailed description of the present invention, which includes a method, a device, and a system for generating per-pixel light values using texture parameters, numerous specific details are set forth to provide a thorough understanding of the present invention. It will be obvious to one skilled in the art, however, that the present invention may be practiced without these specific details. In other instances, well-known methods, procedures, components, and circuits have not been described in detail to avoid unnecessarily obscuring certain aspects of the present invention.

Figure 1:
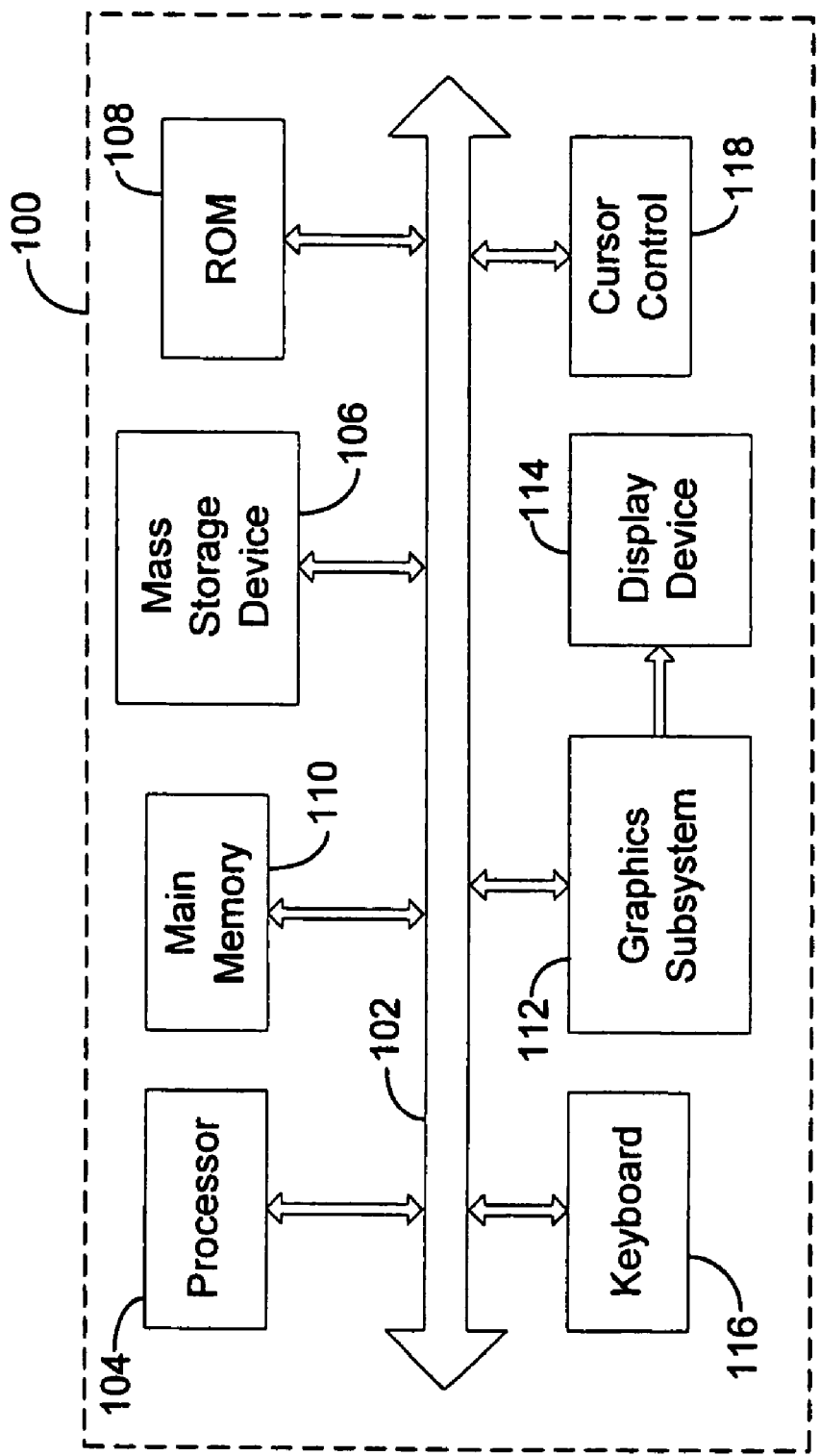
FIG. 1 illustrates a block diagram of a computer graphics system within which the present invention may be implemented or practiced.

FIG. 1 illustrates a block diagram of a computer graphics system 100 within which the present invention may be implemented or practiced. It should be borne in mind that the computer graphics system 100 is exemplary only and that the present invention can operate within a number of different computer system configurations including general purpose computer systems, embedded computer systems, and computer systems specially adapted to electronic design automation. In describing various embodiments of the present invention, certain processes and operations are realized as a series of instructions (e.g., software programs) that reside within computer readable memory units of computer graphics system 100 and are executed by processors therein.

The computer graphics system 100 may be any computer-controlled graphics system suitable for generating complex 2D or 3D images. The computer graphics system 100 includes a bus 102 for transmitting information between the various parts of the computer system. One or more processors 104 for processing information are coupled to the bus 102. The information, together with the instructions for processing the information, is stored in a hierarchical memory system comprised of a mass storage device 106, a read only memory (ROM) 108, and a main memory 110. The mass storage device 106 is used to store a vast amount of data and may include one or more hard disk drives, floppy disk drives, optical disk drives, tape drives, CD-ROM drives, or any number of other types of storage devices having media for storing data. The ROM 108 is used to store data on a permanent basis, such as instructions for the microprocessors. The main memory 110 is used for storing data on an intermediate basis. The main memory 110 may be DRAM, SDRAM, RDRAM, or any other suitable memory for storing data.

A graphics subsystem 112 may be included in the computer graphics system 100. The processor 104 provides the graphics subsystem 112 with graphics data, such as drawing commands and primitives, which are preferably polygons. The primitives are defined by a set of vertices. Vertex data define the vertices and include vertex colors, coordinates, normals, texture coordinates, etc. For example, the vertex data may include parameters such as pixel color, an outward normal vector N, a light vector L, a view vector V, and the like. As such, the vectors N, L, and V are referred to herein as per-vertex parameters that are specified at each vertex of a primitive. The spotlight source direction vector S, although associated with the light vector L, is a per light-source vector (i.e., constant for a given light source). In contrast, other parameters are per-primitive parameters defined for a primitive as a whole. Some examples of per-primitive parameters are as follows: emission material color $e_{cm}$, ambient material color $a_{cm}$, global ambient light color $a_{cs}$, attenuation factor art, ambient light color $a_{cl}$, diffuse material color $d_{cm}$, diffuse light color $d_{cl}$, specular material color $s_{cm}$, specular light color $s_{cl}$, specular exponent 5, environment map, shadow, and a surface normal vector.

As will be described in more detail below, the present invention selects a set of parameters from one or both of the per-primitive and per-vertex parameters and generates texture values for the selected parameters. The parameters for which texture values may be substituted in a lighting equation may be varied, but preferably include the normal vector N and all of the per-primitive parameters. These parameters are selectable from the superset of per-primitive and per-vertex parameters and are referred to herein as "selectable parameters." The unselected parameters may be used without modification in evaluating a light equation to determine a pixel value. The generated texture values and the unselected parameters may then be used in evaluating a pixel value in accordance with any suitable light equation. It should be appreciated by those skilled in the art that in addition to the above-described parameters, texture values may be generated for other parameters in a lighting model or equation for evaluating a pixel light value.

With continuing reference to FIG. 1, a display device 114 is coupled to the graphics subsystem 112 to receive image data (e.g., pixel data) for display. Alternatively, the display device 114 may be coupled to the computer graphics system 100 via the bus 102. As used herein, the display device 114 includes any suitable device for displaying or recording graphics data.

Other devices may also be coupled to the computer graphics system 100. For example, an alphanumeric keyboard 116 may be used for entering commands and other information to processor 104 via the bus 102. Another type of user input device is cursor control device 118 (e.g., mouse, trackball, joystick, and touchpad) used for positioning a movable cursor and selecting objects on a computer screen.

Figure 2:
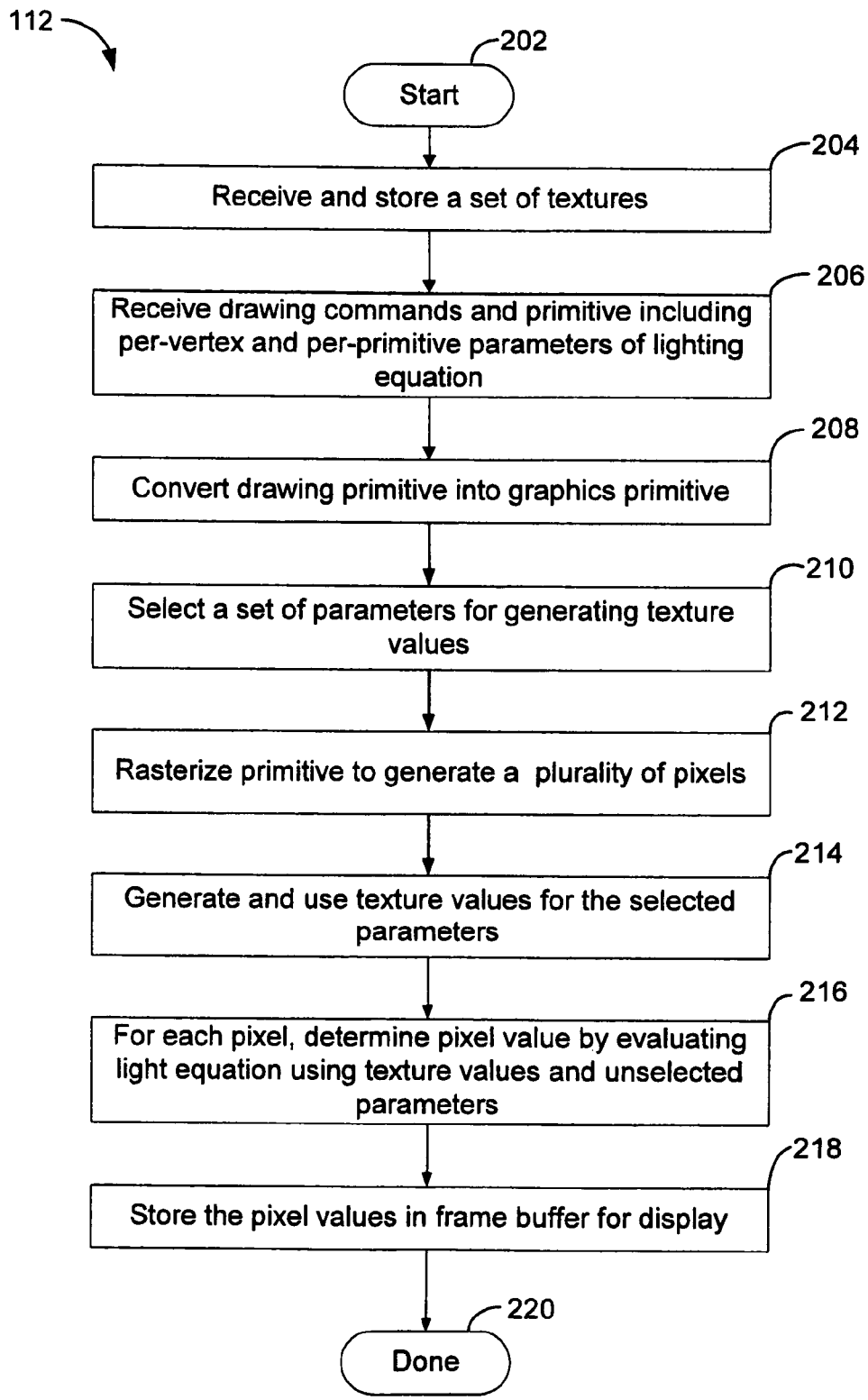
FIG. 2 shows a flowchart of a method performed by a graphics subsystem in accordance with one embodiment of the present invention.

FIG. 2 shows a flowchart of a method performed by the graphics subsystem 112 in accordance with one embodiment of the present invention. The method begins in operation 202 and proceeds to operation 204, where a set of textures for primitives are received and stored in a texture memory. The stored textures are used to substitute for one or more parameters in a lighting equation. Although the set of textures may include any suitable number of textures, a preferred embodiment of the present invention provides up to four texture maps. In operation 206, drawing commands and drawing primitives are received from the host processor 104. The drawing commands specify the operations to be performed on the drawing primitives and on the parameters and/or textures. The drawing primitives include texture coordinates and primitive data in a lighting equation such as the vectors N, L, V, and S, the specular exponent s, and other material parameters.

The method continues to operation 208, where the drawing primitives are converted into graphics primitives, which are preferably defined by per-vertex data. The graphics primitives are preferably polygons, and more preferably triangles. Each of the polygons is defined by the per-vertex and per-primitive parameters described above. After the conversion into graphics primitives, a set of parameters is selected from the selectable per-vertex and per-primitive parameters for generating texture values in operation 210. In a preferred embodiment, up to four parameters may be selected to generate four texture values. Preferably, one texture value is generated for each selected parameter. Next, in operation 212, each of the primitives is rasterized to generate a set of pixels. The rasterization process, which is well known in the art, essentially converts the primitives into corresponding pixels.

After rasterization, in operation 214, texture values are generated and substituted for the selected parameters in a lighting equation. Then, for each pixel in a primitive, a pixel value is determined by evaluating the light equation using the generated texture values and the unselected parameters in operation 216. As each pixel value is generated, the pixel value is stored into a frame buffer for display in operation 218. The method then terminates in operation 220. This method is carried out on a per-pixel basis for each pixel in a primitive. It is contemplated that the present invention can apply equally to subpixels as in supersampling.

Figure 3:
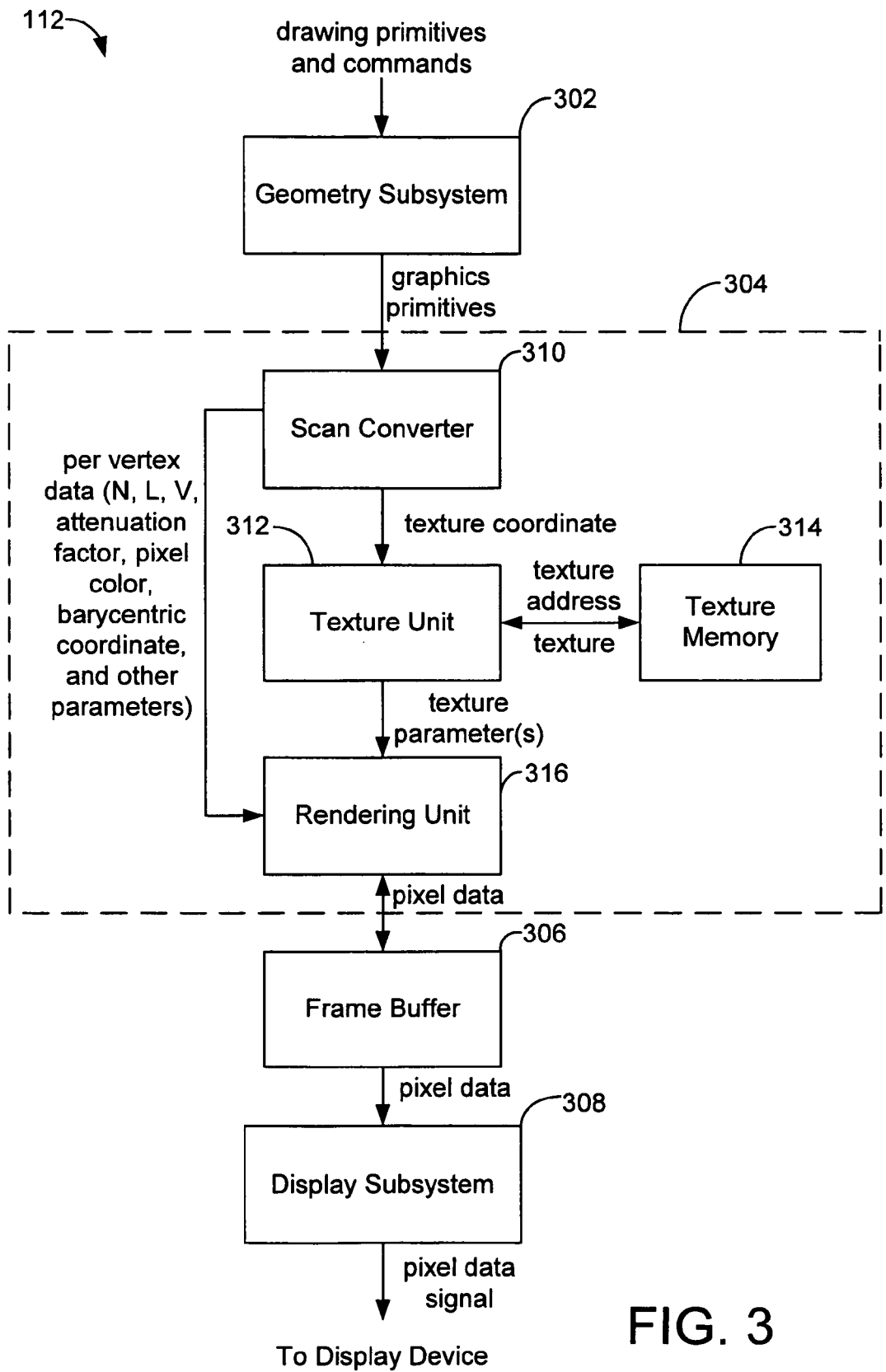
FIG. 3 illustrates a more detailed block diagram of the graphics subsystem in accordance with another embodiment of the present invention.

FIG. 3 illustrates a more detailed block diagram of the graphics subsystem 112 in accordance with another embodiment of the present invention. The graphics subsystem 112 receives the drawing commands and primitives described above. The graphics subsystem 112 includes a geometry subsystem 302, a rasterization subsystem 304, a frame buffer 306, and a display subsystem 308.

In this configuration, the geometry subsystem 302 receives drawing primitives in object coordinate space and texture download commands. The geometry subsystem converts the drawing primitives in object coordinates into graphics primitives in screen coordinate space (e.g., (x, y, z)). In addition, the geometry subsystem 302 also may perform transformations including tessellation, clipping, state management, and the like.

The resulting graphics primitives in screen coordinate space are then provided to the rasterization subsystem 304, which is coupled to the geometry subsystem 302. The rasterization subsystem 304 rasterizes the received graphics primitives in coordinate screen space into pixels and determines pixel values at each of the pixels by evaluating a lighting equation. At this stage, the rasterization subsystem 304 also may perform well-known operations such as Z-buffering, blending, and antialiasing.

The rasterization subsystem 304 stores the generated pixel data values into a frame buffer 306. The display subsystem 308 is coupled to receive pixel data from the frame buffer 306 for subsequent display or storage. For example, the display subsystem 308 may convert the pixel data into analog signals for display on a display device.

The rasterization subsystem 304 of FIG. 3 further includes a scan converter 310, a texture unit 312, a texture memory 314, and a rendering unit 316. The scan converter 310 receives the graphics primitives from the geometry subsystem 302 and converts the primitives into individual pixels. The texture memory 314 stores a set of texture maps for use in generating texture values for one or more selected parameters.

The texture unit 312 is coupled to receive the texture coordinates of one or more parameters selected for texture mapping. Specifically, the texture unit 312 converts the texture coordinates associated with the selected parameters into one or more texture addresses. Based on the texture addresses, the texture unit 312 accesses a texture map stored in the texture memory 314. The texture map thus accessed includes a plurality of texels, which are texture samples. The texture unit 312 also may perform a texture filtering operation by mapping the received texel samples into an associated texel element. Techniques for mapping a texture onto a surface of a primitive are well known in the art. The filtered texture (i.e., texture value) for the pixel is then transmitted to the rendering unit 316 for computing a pixel value for each pixel.

With continuing reference to FIG. 3, the rendering unit 316 is coupled to the scan converter 310 to receive per-vertex data such as the N, L, and V vectors, attenuation factor, pixel color, and barycentric coordinates (as will be discussed further below) along with other unselected parameters for computing pixel values in accordance with a lighting equation. The rendering unit 316 is also coupled to the texture unit 312 to receive the generated textures associated with the selected parameters. Based on the texture values and the unselected parameters, the rendering unit 316 determines a pixel value at the associated pixel by evaluating a lighting equation. The pixel value is then transmitted to the frame buffer 306 for storage.

Figure 4:
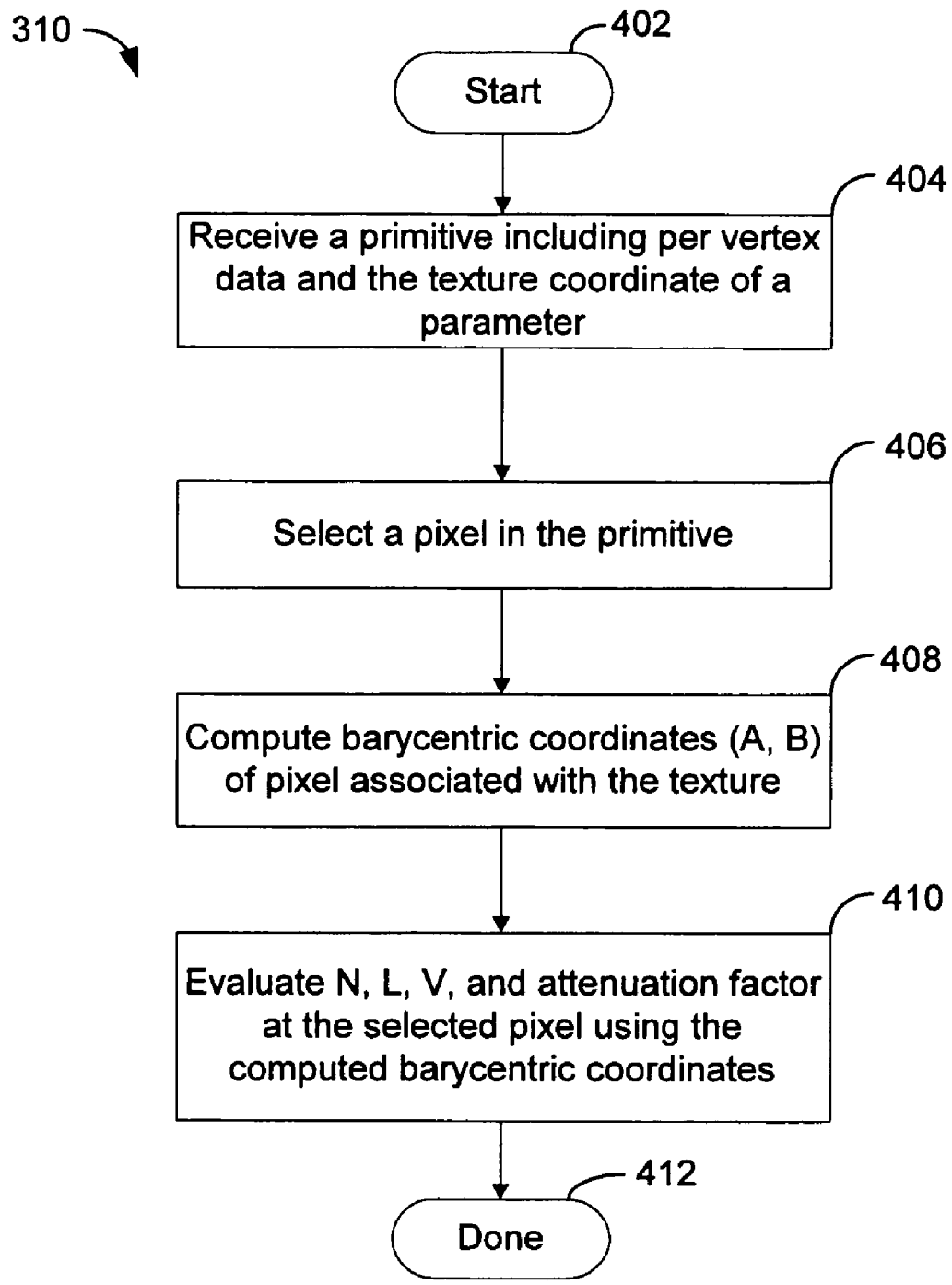
FIG. 4 shows a method performed by a scan converter for generating individual pixels and texture coordinates in accordance with one embodiment of the present invention.

FIG. 4 illustrates a method performed by the scan converter 310 for generating individual pixels and texture coordinates in accordance with one embodiment of the present invention. The method begins in operation 402 and proceeds to operation 404, where a primitive and texture coordinates of one or more selected parameters are received.

In operation 406, a pixel is selected within the primitive for determining pixel data values. Preferably, the pixel is selected in accordance with well-known scan conversion methods. In operation 408, the barycentric coordinates (A, B) are computed for the selected pixel. Barycentric coordinates are well known in the art and are described, for example, in Curves and Surfaces for Computer-Aided Geometric Design, Fourth Ed., ISBN 0-12-249054-1, by Gerald Farin. Although the use of barycentric coordinates is described herein, those skilled in the art will recognize that any coordinate space suitable for computing a pixel value also may be used.

After computing the barycentric coordinates (A, B) for the selected pixel, the values of the N, L, and V vectors, and the attenuation factor are evaluated, in operation 410, at the selected pixel using the barycentric coordinate for the pixel. The method may be repeated for each of the pixels in the primitive and thereafter terminates in operation 412.

Figure 5:
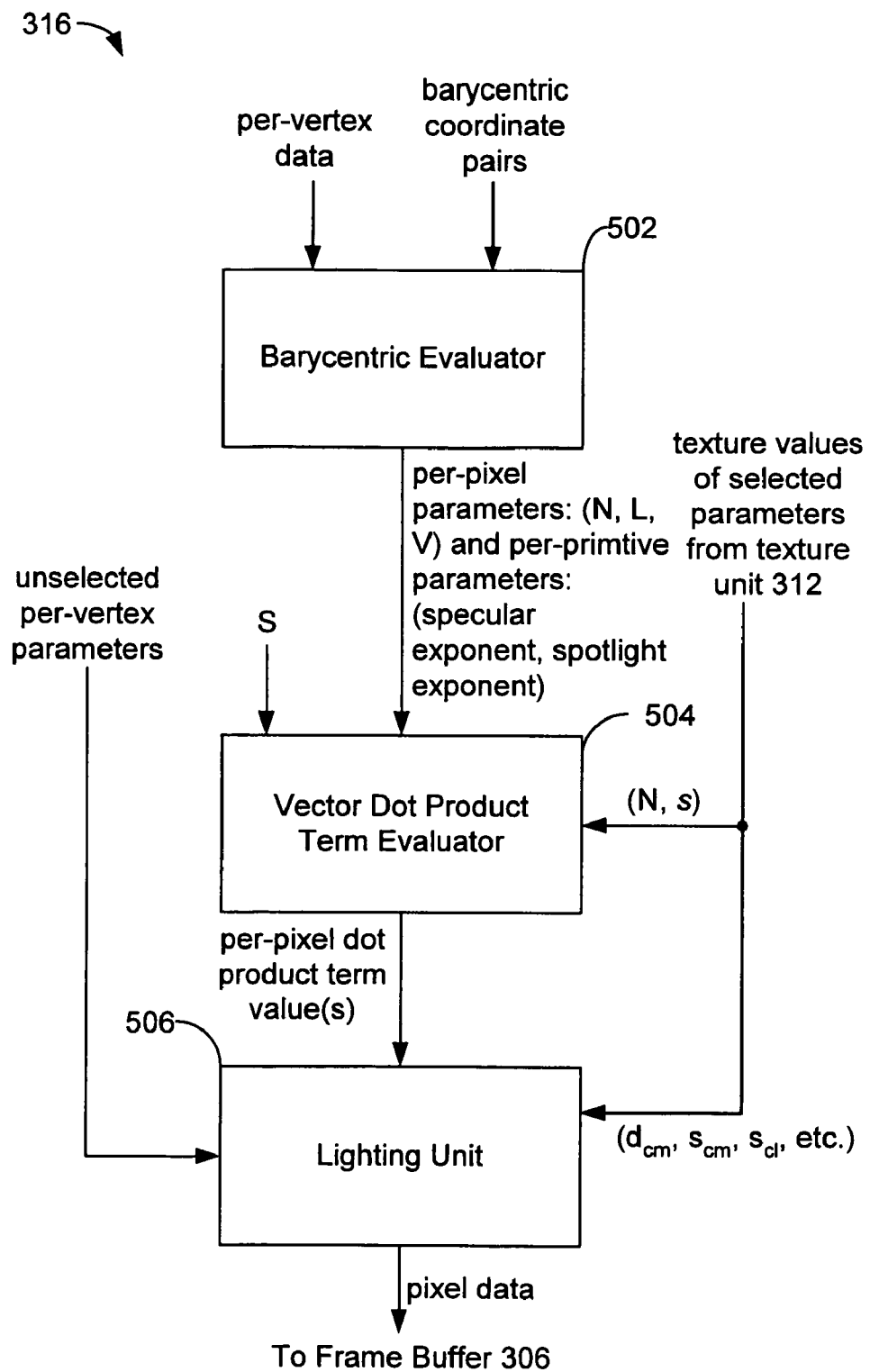
FIG. 5 illustrates a more detailed block diagram of a rendering unit in accordance with one embodiment of the present invention.

The rendering unit 316 (see FIG. 3) receives the texture values associated with the selected parameters from the texture unit 312 and uses the texture values in rendering the associated pixel. FIG. 5 illustrates a more detailed block diagram of the rendering unit 316 in accordance with one embodiment of the present invention. The rendering unit 316 includes a barycentric evaluator 502, a vector dot product term evaluator 504, and a lighting unit 506. The barycentric evaluator 502 receives the per-vertex parameter data and the barycentric coordinates (A, B) associated with a given pixel. Based on the per-vertex and barycentric coordinate data, the barycentric evaluator 502 computes per-pixel parameters at the given pixel such as the N, L, and V vectors. Preferably, the barycentric evaluator 502 computes the per-pixel parameter values for only those parameters that have not been selected for texture substitution.

The vector dot product term evaluator 504 is coupled to the barycentric evaluator 502 to receive the per-pixel parameters. In addition, the vector dot product term evaluator 504 receives a spotlight source direction vector S and texture values of the selected parameters for computing one or more dot product terms such as the diffuse dot product term (N·L), the specular dot product power term (N·L), and the spotlight dot product power term $(S \cdot L)^{exp}$. When a parameter to be used in the vector dot product term evaluator 504 is a selected parameter, the vector dot product term evaluator 504 receives the texture value of the selected parameter from the texture unit 312. For example, when the normal vector N and the specular exponent s are selected to be replaced by texture parameters, the texture values corresponding to the normal vector and the specular exponent are received from the texture unit 312. Then, the received texture parameters are used in lieu of conventional N and s values in computing the specular dot product term. Dot product term evaluators are described in more detail in the co-pending U.S. Parent application Ser. No. 09/265,507 entitled "Method and Device for Generating Per-Pixel Light Values," by Tannenbaum et al.

The lighting unit 506 of FIG. 5 receives the per-pixel dot product term values and the texture parameters of the selected parameters for computing a pixel value at the associated pixel. In addition, the lighting unit 506 also receives other parameters that were not selected for texture replacement. That is, the unselected parameters are parameters other than those used in the vector dot product term evaluator 506 and the texturized parameters. Using the per-pixel dot product term values, the texture parameter values, and the unselected parameter values, the lighting unit 506 computes the pixel color value at the pixel associated with these parameters. Although the use of both constant per-primitive parameters and texture parameters is described herein, it should be appreciated that, if desired, texture parameters may be used in place of all the constant parameters. The generated pixel data is then transmitted to the frame buffer 306 for storage.

Figure 6:
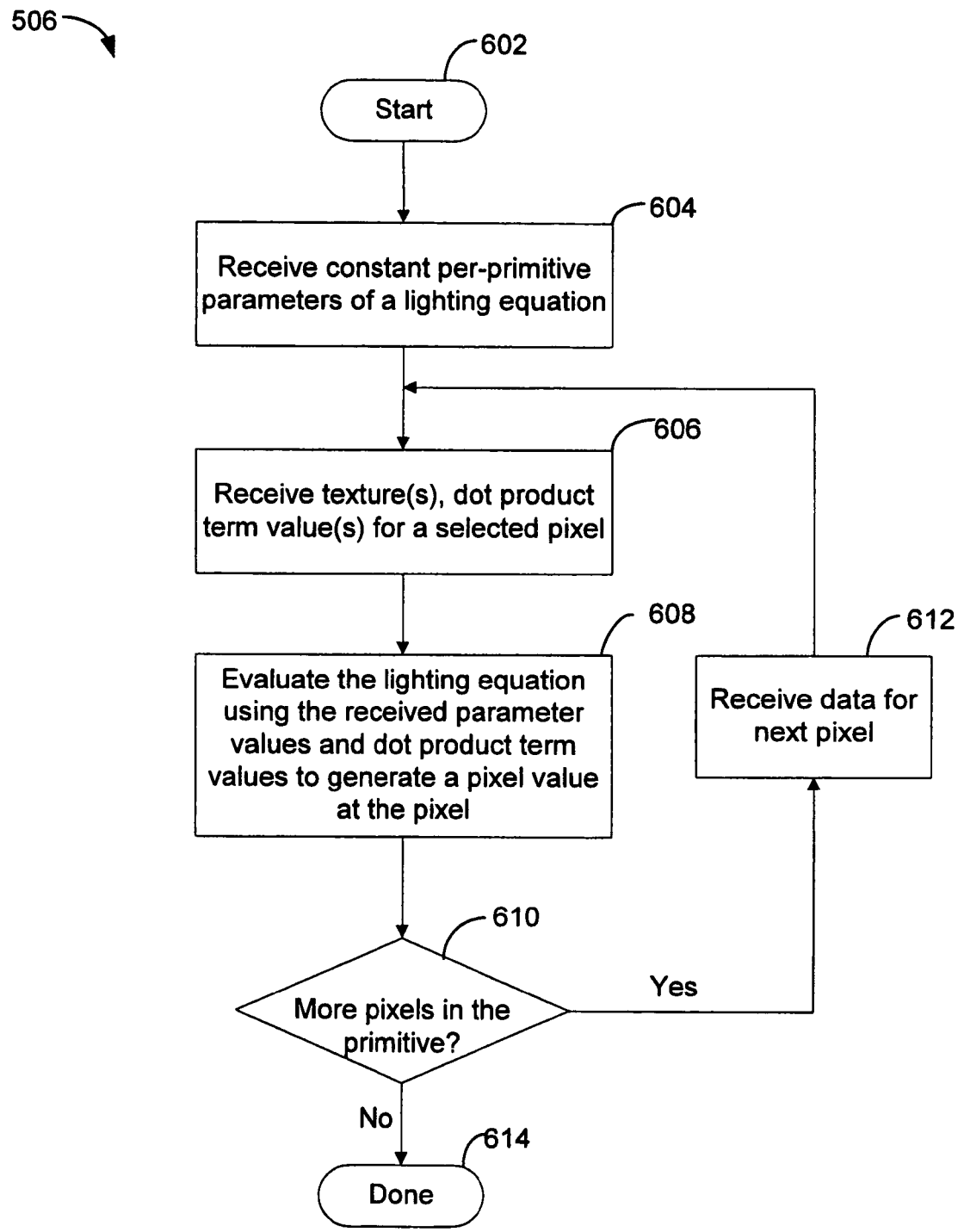
FIG. 6 shows a method performed by a lighting unit for computing a pixel value at each of the pixels in a primitive in accordance with one embodiment of the present invention.

FIG. 6 illustrates an exemplary method performed by the lighting unit 506 for computing a pixel value at each of the pixels in a primitive. The method begins in operation 602 and proceeds to operation 604, where the unselected (i.e., constant) per-primitive parameters of a lighting equation are received. Then, in operation 606, the texture values of the selected parameters and the dot product term values associated with a pixel are received for determining the value of the pixel. After receiving the necessary parameter values, in operation 608, a lighting equation is evaluated using the received parameter values and dot-product term values to generate the pixel value. Next, in operation 610, it is determined whether more pixels are in the primitive. If there are additional pixels, then the method proceeds to operations 612 and 606 to receive data for the next pixel. Otherwise, the method terminates in operation 614.

The present invention thus provides a method, device, and system that can efficiently generate per-pixel light values in a primitive by using textures for one or more parameters. As illustrated above, the present invention enables the generation of pixel values that vary over the surface of a primitive by using a set of texture maps. Each of the texture maps models varying characteristics of a parameter over a surface. By using the texture values instead of constant parameters in rendering a pixel, the present invention enables the rendering of a more realistic surface. In addition, by providing textures that can be selectively associated with one or more parameters, the present invention provides substantial flexibility in rendering an image of a surface.

The invention has thus been described herein in terms of several preferred embodiments. Other embodiments and equivalents of the invention will be apparent to those skilled in the art from consideration of the specification and practice of the invention. The embodiments and preferred features described above should be considered exemplary, with the invention being defined by the appended claims.

What is claimed is:

1. A method for use in a computer graphics system for applying texture mapping in per-pixel operations, the method comprising:

receiving at the computer graphics system a plurality of parameters that are used to define a pixel value at a pixel in a primitive;

selecting by the computer graphics system parameters from the plurality of parameters to generate selected parameters and unselected parameters where the unselected parameters are the plurality of parameters that are not selected;

substituting by the computer graphics system a texture value from a texture map in place of at least one selected parameter used in an algorithm that uses the selected parameters, the texture value varying over the primitive;

determining by the computer graphics system the pixel value by using the unselected parameters and the texture value varying over the primitive, wherein the set of unselected parameters are not a texture value and the texture value is associated with the selected parameters; and storing the generated pixel value in a frame buffer of the computer graphics system.

2. The method as recited in claim 1, further comprising: displaying the pixel according to the determined pixel value on a display device.

3. The method as recited in claim 1, wherein the plurality of parameters includes per-primitive parameters, which are defined over the entire primitive.

4. The method as recited in claim 1, wherein the primitive is a polygon.

5. The method as recited in claim 1, wherein the plurality of parameters includes both scalar and vector parameters.

6. The method as recited in claim 3, wherein the plurality of parameters includes one or more of emission material color, ambient material color, global ambient light color, attenuation factor, ambient light color, diffuse material color, diffuse light color, specular material color, specular light color, a surface normal vector, a specular exponent, an environment map color, and a shadow color.

7. The method as recited in claim 1, comprising determining the texture value further comprises the operations of:

receiving texture coordinates for accessing a set of texture maps; and accessing the texture maps in response to the texture coordinates to generate the texture value.

8. The method as recited in claim 7, wherein the accessed textures includes a plurality of texture elements, the method further comprising the operation of:

filtering accessed texture elements of the texture map onto the selected pixel to generate the texture value associated with the pixel.

9. The method as recited in claim 1, wherein a light value is generated for the pixel value by evaluating a lighting equation that is defined in terms of the substituted texture value from the texture map.

10. A device for generating per-pixel values of pixels in a primitive by using texture parameters, the pixel values of the pixels in the primitive being partially defined by a plurality of parameters, where a pixel value is not such a parameter, the device comprising:

a texture memory for storing a set of texture maps;

a texture unit for receiving texture coordinates for accessing a set of selected texture maps in the texture memory, the set of selected texture maps being associated with a set of selected parameters wherein the selected parameters are selected from among the plurality of parameters that partially define a pixel value in the primitive, the texture unit generating a texture value associated with the pixel from each of the selected texture maps, and wherein at least one other parameter in the plurality of parameters are not selected and the at least one other parameter that is not selected from the plurality of parameters define a set of unselected parameters; and a rendering unit for generating the pixel value in response to the generated texture values and the set of unselected parameters;

and a frame buffer in communication with said rendering unit, said frame buffer accepting said generated pixel value for storage.

11. The device as recited in claim 10, wherein the primitive is a polygon.

12. The device as recited in claim 10, wherein one or more of the selected parameters are selected from a parameter group consisting of emission material color, ambient material color, global ambient light color, attenuation factor, ambient light color, diffuse material color, diffuse light color, specular material color, specular light color, a surface normal vector, a specular exponent, an environment map color, and a shadow color.

13. The device as recited in claim 10, wherein the plurality of parameters includes both scalar and vector parameters.

14. The device as recited in claim 10, wherein the pixel value is a light value that is generated by evaluating a lighting equation using the plurality of parameters.

15. A computer graphics system for generating per-pixel values for pixels in a primitive by using texture parameters, the pixel values being defined by a plurality of parameters, the system comprising:

a bus;

a processor coupled to a the bus;

a main memory coupled to the bus;

a storage unit coupled to the bus; and a graphics subsystem coupled to receive a plurality of parameters defining the pixel values for the pixels in the primitive, the graphics subsystem including:

means for selecting parameters from the plurality of parameters to generate selected parameters and unselected parameters where the unselected parameters are the plurality of parameters that are not selected;

means for substituting a texture value from a texture map in place of at least one selected parameter used in an algorithm that uses the selected parameter to determine a pixel value, the texture value varying over the primitive; and means for determining the pixel value by using the unselected parameters and the texture value varying over the primitive, wherein the set of unselected parameters are not a texture value and the texture value is associated with the selected parameters;

and a frame buffer in communication with said rendering unit, said frame buffer accepting said generated pixel value for storage.

16. The system as recited in claim 15, wherein one or more of the selected parameters are selected from a parameter group consisting of emission material color, ambient material color, global ambient light color, attenuation factor, ambient light color, diffuse material color, diffuse light color, specular material color, specular light color, a surface normal vector, a specular exponent, an environment map color, and a shadow color.

17. The system as recited in claim 15, wherein the plurality of parameters includes both vector and scalar parameters.

18. The system as recited in claim 15, wherein the pixel value is a light value that is generated by evaluating a lighting equation using the substituted texture value from the texture map.

19. The system as recited in claim 15, wherein the primitive is a polygon.

20. The system as recited in claim 15, comprising means for determining a texture value by filtering an accessed set of texture maps to generate texture values.

* * * * *